United States Patent [19]

Kawamura et al.

[11] 4,175,522
[45] Nov. 27, 1979

[54] EXHAUST GAS RECIRCULATION DEVICE FOR INTERNAL COMBUSTION ENGINE WITH AUXILIARY COMBUSTION CHAMBER

[75] Inventors: Hideo Kawamura, Yamato; Hideo Ohta, Kohza; Kimi Kubota, Chigasaki, all of Japan

[73] Assignee: Isuzu Motors Limited, Kawasaki, Japan

[21] Appl. No.: 869,962

[22] Filed: Jan. 16, 1978

[30] Foreign Application Priority Data

Jan. 24, 1977 [JP] Japan .................................... 52/6652

[51] Int. Cl.$^2$ ............................................. F02M 25/06
[52] U.S. Cl. .................................................. 123/119 A
[58] Field of Search .................................... 123/119 A

[56] References Cited

U.S. PATENT DOCUMENTS

| | | | |
|---|---|---|---|
| 2,456,213 | 12/1948 | Pelc | 123/119 A |
| 2,701,556 | 2/1955 | Woerner | 123/119 A |
| 3,702,111 | 11/1972 | Weaving et al. | 123/119 A |
| 3,703,164 | 11/1972 | Weaving | 123/119 A |
| 3,785,355 | 1/1974 | Toepel | 123/119 A |
| 3,799,130 | 3/1974 | Dahlstrom | 123/119 A |
| 3,834,364 | 9/1974 | Bartholomew | 123/119 A |
| 3,982,514 | 9/1976 | Turns et al. | 123/119 A |
| 3,986,351 | 10/1976 | Woods et al. | 123/119 A |
| 4,011,845 | 3/1977 | Mayer et al. | 123/119 A |
| 4,060,059 | 11/1977 | Blaser | 123/119 A |

*Primary Examiner*—Wendell E. Burns
*Attorney, Agent, or Firm*—Sughrue, Rothwell, Mion, Zinn and Macpeak

[57] ABSTRACT

A recirculating and recombustion type of exhaust gas purification system for a compression ignition engine includes an expansion manifold communicating with auxiliary combustion chambers of each cylinder through separate passages. Cam operated valves are located in each of the separate passages. The exhaust gas in an auxiliary combustion chamber is expanded into the manifold through one of the cam operated valves and is then drawn into the auxiliary combustion chamber of another cylinder whose piston is near the bottom of its intake or suction stroke via another open cam operated valve. The cam operated valves are actuated by hydraulic tappets which are controlled by a solenoid control valve. The solenoid control valve is energized under conditions of high load operation of the engine and, as a result, a hydraulic path is established which allows oil supplied to the tappets to return to the sump. Under this condition, the cam operated valves do not open.

4 Claims, 3 Drawing Figures

EXHAUST GAS RECIRCULATION DEVICE FOR INTERNAL COMBUSTION ENGINE WITH AUXILIARY COMBUSTION CHAMBER

BACKGROUND OF THE INVENTION

The present invention relates to an exhaust gas purifying device for a compression ignition type of internal combustion engine provided with auxiliary combustion chambers.

Most conventional exhaust gas purifying devices using an exhaust gas recirculation system in a compression ignition internal combustion engine are external recirculation type devices in which parts of the exhaust gas from the exhaust manifold or the exhaust conduit system are recirculated to the intake manifold or the intake conduit system. However, such conventional devices adversely affect the engine performance and smoke generation is substantial due to the small excess air ratio, and the exhaust gas recirculation conduit, intake manifold and the like become contaminated or at worst become blocked due to smoke deposits.

SUMMARY OF THE INVENTION

In view of the drawbacks accompanying the conventional devices, an object of the present invention is to control exhaust gas circulation by use of a control valve during the high load operation of an engine. In the present invention, each of the auxiliary combustion chambers communicates through an exhaust gas expansion manifold and cam operated valves with the other auxiliary combustion chambers. The cam operated valves are actuated by hydraulic tappets which are controlled by a solenoid control valve. The solenoid control valve is energized under conditions of high load operation of the engine and as a result, a hydraulic path is established which allows oil supplied to the tappets to return to the sump. Under this condition, the cam operated valves do not open.

DETAILED DESCRIPTION OF THE PREFERRED EMBODIMENT

Figure 1:
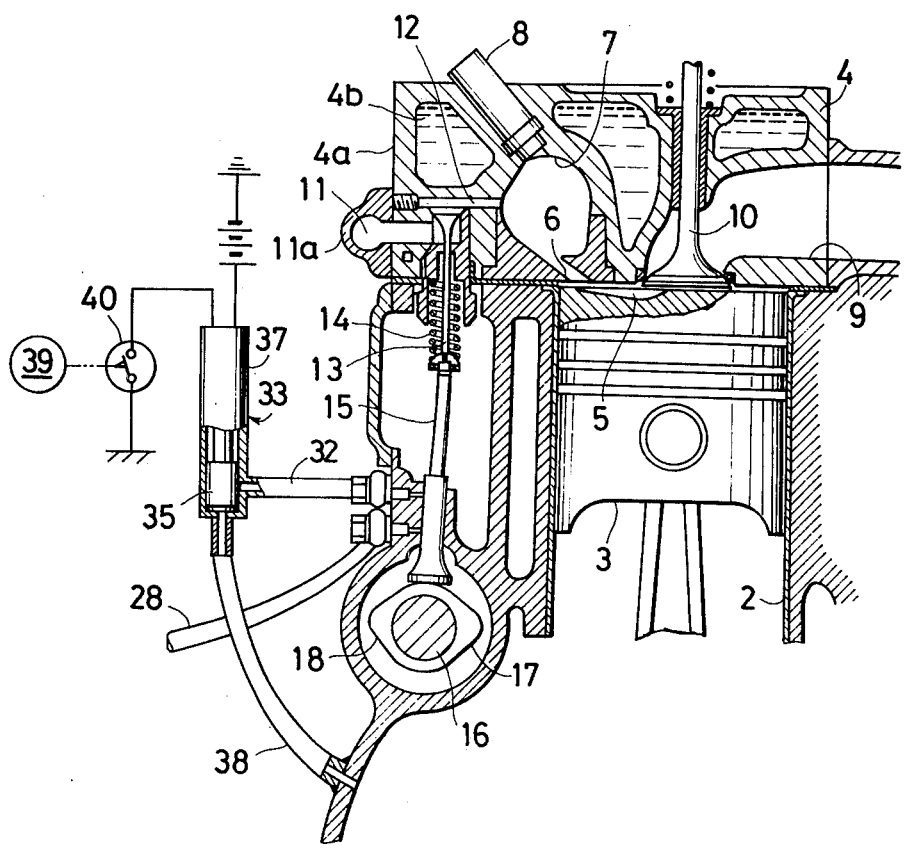
FIG. 1 is a vertical sectional view of an engine cylinder illustrating one embodiment of the invention.

Referring to the drawings, FIG. 1 shows a cylinder body 1, for example, of four cylinders #1-4 of a compression ignition internal combustion engine having auxiliary combustion chambers. A piston 3 is reciprocably inserted into each cylinder 2. A cylinder head 4 is provided with an auxiliary combustion chamber 7 communicating through a passage 6 with a primary combustion chamber 5. Further, an injection nozzle 8 for injecting fuel from a supply source (not shown) into the auxiliary combustion chamber 7 is provided in the cylinder head.

An exhaust gas passage 9 communicates with the primary combustion chamber 5 through an exhaust valve 10 operable for opening in association with in intake valve (not shown) by a conventional cam mechanism.

Figure 2:
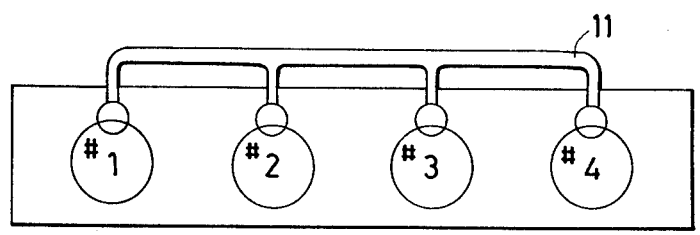
FIG. 2 shows a plan schematic view of the cylinder arrangement and the exhaust gas expansion manifold of the present invention.

An exhaust gas expansion manifold 11 is provided on wall 4a of the cylinder head 4. The exhaust gas expansion manifold communicates through separate passages 12 with the auxiliary combustion chambers 7 of each of the cylinders #1-4 as shown in FIGS. 1 and 2. A valve 13 is provided midway of the passage 12, and this valve is usually closed by the action of a return spring 14 and is opened by the raising movement of a rod mechanism 15. A cam shaft 16 is rotated in response to the crank shaft (not shown) and is provided with a plurality of cams (not shown) driving the valve mechanisms of intake valves and exhaust valves. On the same cam shaft, the rod mechanism 15 is upwardly moved by cams 17 and 18 near the end of the expansion stroke in each of cylinders #1-4, that is, in the expansion stroke range of 90°-50° (crank angle) before the bottom dead center of each piston 3 thereof and in the latter half of the suction stroke, that is, in the suction stroke range of 60°-20° (crank angle) before the bottom dead center of each piston 3 thereof. In addition to the structure shown, it is possible to communicate the exhaust gas expansion manifold 11 through a by-pass having a pressure control valve with a suitable portion of the exhaust manifold 9 in order to prevent the internal pressure of the exhaust gas expansion manifold 11 from increasing excessively.

Figure 3:
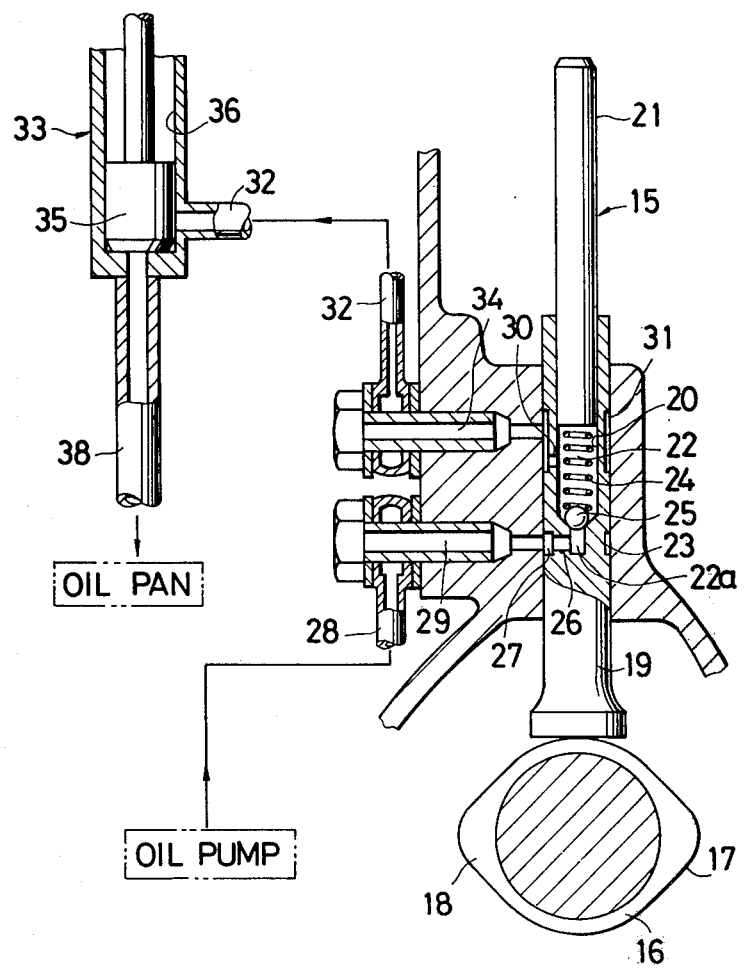
FIG. 3 is a partial sectional view showing the details of the exhaust gas circulation control device of the present invention.

In FIG. 3, a cylindrical hollow space 20 is formed in the rod mechanism 15 from the top of a tappet 19 contacting and driven by the cams 17 and 18. A push rod 21 is inserted from the upper portion of the tappet 19 into the cylindrical hollow space thereof so as to form an oil chamber 22 below the push rod 21. A valve seat 23 is formed at the lower portion of the oil chamber 22. A ball 25 is biased by a coil spring 24 toward the valve seat 23 in the oil chamber 22 so as to allow the oil to flow only from the lower side of the valve seat 23 into the chamber 22. Further, a small chamber 22a defined below the valve seat 23 communicates through a lateral hole 26 with an external annular groove 27. Only when the tappet 19 is not lifted by the cams 17 or 18 does the external annular groove 27 communicate with an oil introducing passage 29 which is formed in the cylinder body 1 and which is connected to an oil pump (not shown) through a pipe 28.

On the other hand, the oil chamber 22 positioned above the valve seat 23 always communicates through at least one oil hole 30 with an external annular groove 31 regardless of the state of the tappet 19. The oil hole 30 is connected through a pipe 32 by means of an oil exhausting passage 34 which is formed in the cylinder body. The pipe 32 is connected to an oil chamber 22.

The oil control device 33 consists of an operational chamber 36 within which a control valve 35 is provided. A solenoid 37 (FIG. 1) controls the movement of the control valve 35. The operational chamber 36 is provided between the pipe 32 extending from the oil exhausting passage 34 and the pipe 38 communicating with an oil pan or sump (not shown) so that the control valve 35 controls opening and closing therebetween. The solenoid 37 is connected to a fuel control lever or the like of a fuel injection pump for detecting the loading state of the engine. A detecting device 39 is operable to close switch 40 (FIG. 1) so as to energize the solenoid 37 and draw the control valve 35 in the opening direction thereof.

The operation of the exhaust gas circulation device according to the present invention will be hereinafter described. In the preferred embodiment of the present invention, the engine is a 4-stroke compression ignition internal combustion engine and consists of four cylinders #1-4 as mentioned above. The engine ignition order is #1, #3, #4 and #2. In such a 4-stroke internal combustion engine, when the piston of cylinder #3, for example, nears the end of its expansion stroke, part of the residual exhaust gas in the associated auxiliary combustion chamber is expelled into the exhaust gas expansion manifold 11 through the passage 12 because the valve 13 is moved upwardly against the spring force of the return spring 14 via the raising movement of the cam 18 and the rod mechanism 15. The opening of valve 13 occurs in the range of 90°-50° (crank angle) before the piston reaches bottom dead center. The exhaust gas which is introduced into the expansion manifold 11 is cooled by expansion of the gas, circulating water in the water jacket, and the outside air to a suitable temperature and at the same time, when another piston, for example the piston of the cylinder #2, is in the latter half of its suction stroke, the valve 13 is opened by the raising action of the cam 17 and the rod mechanism 15 so that the exhaust gas in the expansion manifold 11 is introduced into the auxiliary combustion chamber of the cylinder #2 through the passage 12. The opening of valve 13 in cylinder #2 occurs in the range of 60°-20° (crank angle) before the piston reaches bottom dead center.

In the embodiment disclosed, if the engine ignition order is #1, #3, #4 and #2, the exhaust gas circulation is repeatedly carried out in the following order.

Exhaust gas from #1 cylinder to #4 cylinder,
Exhaust gas from #3 cylinder to #2 cylinder,
Exhaust gas from #4 cylinder to #1 cylinder, and
Exhaust gas from #2 cylinder to #3 cylinder.

Thus, the device according to this invention is so designed that exhaust gas circulation is effected from the auxiliary combustion chamber of one cylinder to that of another cylinder. Therefore, as compared with a conventional exhaust gas circulation system, an internal combustion engine employing the device of the invention achieves improved volumetric efficiency in each cylinder. When the control valve 13 closes, the exhaust gas is sealed in the auxiliary combustion chamber 7 by the upward movement of the piston 3. Therefore, an improved exhaust gas circulation effect is obtained, and the exhaust gas circulation rate with respect to the volume of the auxiliary combustion chamber 7 can be made extremely high.

Further, when the engine loading reaches a load higher than $\frac{3}{4}$, the detecting device 39 corresponding to the load detecting device of the fuel control lever or the like closes the switch 40 so as to energize the solenoid 37 thereby drawing the control valve 35 upwardly. As the result, the pipe 32 communicates with the pipe 38 and, since the oil within the oil chamber 22 can be freely introduced through the passage 34, the pipe 32, the operational chamber 36 and the pipe 38 into the oil pan or sump, the push rod 21 can not lift up the valve 13 against the return spring 14 though the lifting action of cams 17 and 18 is applied to the push rod 21 so that the valve 13 is retained at the closed state.

As is clear from the above description, the exhaust gas recirculation in an engine operation load higher than $\frac{3}{4}$ is effectively controlled and, therefore, in such high load operation, reduction of output power of the engine and increase of a resultant smoke are also effecitvely prevented. Additionally, while the preferred embodiment of the present invention involves the detecting of the engine load by means of a fuel control lever 40 on the fuel injection pump, the invention is not limited to this arrangement. For example, the switch 40 can be operated in response to the rotation rate of the engine instead of detecting the engine load. Furthermore, while the valve 13 controlling exhaust gas circulation has been described as being closed by use of the control device 33 in the high load operation of the engine so as to completely prevent gas recirculation, it is possible to modify the control device by employing a throttle type operating mechanism which slightly allows the exhaust gas circulation even in the high load operation of the engine.

As mentioned above, the exhaust gas recirculation from the auxiliary combustion chambers is effectively accomplished, and the amount of the exhaust gas recirculation can be controlled corresponding to the state of the engine load according to the present invention. Therefore, the present invention provides an exhaust gas purifying device without the usual deterioration of engine performance.

What is claimed is:

1. In a multicylinder, four cycle compression ignition internal combustion engine of the type employing auxiliary combustion chambers in which fuel is injected in timed sequence, an exhaust gas recirculating device comprising:

an exhaust gas expansion manifold communicating with each of said auxiliary combustion chambers through separate exhaust passages, a plurality of cam operated valves, one located in each of said separate exhaust passages for controlling the flow of exhaust gas between said auxiliary combustion chambers and said exhaust gas expansion manifold, said cam operated valves being driven by a common cam shaft to open in the expansion stroke and again in the suction stroke of their corresponding cylinders, and hydraulic control means for preventing the opening of said plurality of cam operated valves under condition of high load operation.

2. An exhaust gas recirculating device as recited in claim 1 wherein said cam operated valves are opened in the range of 90°-50° (crank angle) before the bottom dead center of each piston of the power expansion stroke and in the range of 60°-20° (crank angle) before the bottom dead center of each piston of the suction stroke.

3. An exhaust gas recirculating device as recited in claim 1 wherein each of said cam operated valves is actuated by a hydraulic tappet and said control means comprises a control valve for establishing a hydraulic path for allowing oil supplied to the tappets to return to a sump.

4. An exhaust gas recirculating device as recited in claim 3 wherein said control means further comprises a solenoid for actuating said control valve.

* * * * *